United States Patent [19]

Zecher et al.

[11] Patent Number: 4,640,970

[45] Date of Patent: Feb. 3, 1987

[54] PROCESS FOR THE PRODUCTION OF POLYAMIDE IMIDES

[75] Inventors: Wilfried Zecher, Leverkusen; Klaus Reinking, Wermelskirchen; Frank Kleiner, Leverkusen, all of Fed. Rep. of Germany

[73] Assignee: Bayer Aktiengesellschaft, Leverkusen, Fed. Rep. of Germany

[21] Appl. No.: 768,102

[22] Filed: Aug. 21, 1985

[30] Foreign Application Priority Data

Aug. 30, 1984 [DE] Fed. Rep. of Germany ....... 3431857

[51] Int. Cl.$^4$ ............................................. C08G 73/14
[52] U.S. Cl. ...................................... 528/73; 528/903
[58] Field of Search ......................................... 528/73

[56] References Cited

U.S. PATENT DOCUMENTS

| 3,658,773 | 4/1972 | Zecher et al. | 528/45 |
| 4,546,138 | 10/1985 | Zecher et al. | 524/326 |
| 4,548,970 | 10/1985 | Zecher et al. | 524/98 |
| 4,549,006 | 10/1985 | Zecher et al. | 528/73 |

*Primary Examiner*—Maurice J. Welsh
*Attorney, Agent, or Firm*—Connolly and Hutz

[57] ABSTRACT

This invention relates to a process for the production of polyamide imides and the use thereof as plastics materials.

7 Claims, No Drawings

PROCESS FOR THE PRODUCTION OF POLYAMIDE IMIDES

This invention relates to a process for the production of polyamide imides and the use thereof as plastics materials. It is known that aliphatic-aromatic polyamide imides, which are obtained by reacting polyisocyanates with cyclic polycarboxylic acid anhydrides and lactams (DE-AS No. 1 770 202), are characterised by particular properties such as high softening temperatures and good elasticity values and can be used as coatings which are stable under high temperatures, for example in the sector of lacquer for electrical insulation.

It has now been found that polymers with excellent properties are obtained when organic polyisocyanates, such as aliphatic, aliphatic-aromatic and aromatic diisocyanates, are reacted with cyclic polycarboxylic acid anhydrides, lactams and trimellitic imidocarboxylic acids of the formula (I)

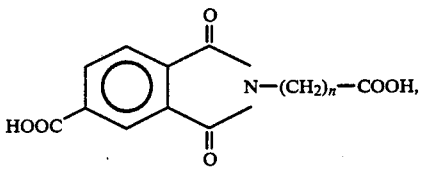

wherein
n represents an integer of from 1 to 20,
at a temperature of from 0° to 400° C. and optionally in a solvent.

A preferred embodiment consists in the use of lactams which contain more than five carbon atoms in the ring.

It has furthermore been found that these polymers can be produced, for example, in solvents and then can be concentrated in an evaporation extruder at a temperature of from 250° to 400° C., optionally under vacuum.

The polyamide imides produced according to the invention are characterised by good mechanical values such as stability under heat and impact strength, good flow behaviour, increased decomposition temperatures and a substantially lighter colour in comparison with polymers produced without trimellitic imidocarboxylic acids using lactams or mixtures thereof.

The trimellitic imidocarboxylic acids used according to the invention can be obtained according to known processes, for example from trimellitic acid anhydride and the lactams or aminocarboxylic acids. They can be produced separately or "in situ", for example by heating trimellitic acid anhydride with a lactam and subsequent addition of the remaining components. The trimellitic imidocarboxylic acids correspond to the formula (I)

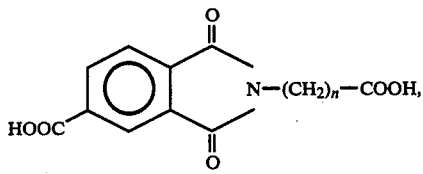

wherein the aliphatic radical can be substituted once or several times by alkyl groups having from 1 to 6 carbon atoms and in which n represents an integer of from 1 to 20.

n preferably corresponds to the numbers 1, 3, 10 and 11, and trimellitic imidocaproic acid corresponding to n=5 is particularly preferred.

Lactams used according to the invention are, for example, those of the formula (II)

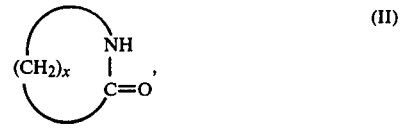

wherein
x represents an integer of from 2 to 20.

Preferably caprolactam is used, but particularly preferably lauryl lactam (n=11) is used.

Polyisocyanates which can preferably by used for the process according to the invention are those described, for example, in DE-OS No. 1 770 202.

Particularly preferred are phosgenated condensates of aniline and formaldehyde with polyphenylenemethylene structures, technical mixtures of toluylene diisocyanates, m-phenylene-diisocyanante and symmetrical compounds such as 4,4'-diisocyanato-diphenylmethane, 4,4'-diisocyanato-diphenylether, napthalene-1,5-diisocyanate, p-phenylenediisocyante, 4,4'-diisocyanato-diphenyl-dimethylmethane, analogous hydroaromatic diisocyanates such as 4,4'-diisocyanato-dicyclohexylmethane as well as aliphatic diisocyanates having from 2 to 12 carbon atoms such as hexamethylene diisocyanate and isomeric trimethylhexamethylene diisocyanates and diisocyanates derived from isophorone.

A particular embodiment consists in the use of mixtures of from 40 to 95% by weight of an aromatic diisocyanate, for example 4,4-diisocyanato-diphenylmethane or 2,4- or 2,6-toluylene diisocyanate, and from 5 to 60% by weight of an aliphatic diisocyanate, for example 4,4'-diisocyanato-dicyclohexylmethane, isophorone-diisocyanate, hexamethylene diisocyanate and trimethyl-hexamethylene diisocyanate.

In place of isocyanates, compounds can also be used which react as isocyanates under the reaction conditions, preferably the addition compounds of alcohols, phenols and lactams, for example of phenol, technical cresol mixtures and caprolactam, pyrrolidine or of mixtures of the amines corresponding to the isocyanates and aliphatic and aromatic carbonic acid esters, for example carbonic acid diethyl ester, carbonic acid diphenyl ester and ethylene carbonate, which can also already be partially reacted with each other, or also polycarbodiimides and isocyanato-isocyanurates of the described polyisocyanates.

For regulating the molecular weight, monofunctional isocyanates such as phenyl isocyanate, tolyl isocyanate, cyclohexyl isocyanate, stearyl isocyanate, ω, ω, ω-trifluoroethyl isocyanate, and 3,5-trifluoromethylphenylisocyanate or the corresponding amines can be used.

Cyclic polycarboxylic acid anhydrides can be used for the production of polyamide imides used according to the invention, as described in DE-OS No. 1 770 202 and DE-OS No. 2 542 706, preferably polycarboxylic acid anhydrides of the formula (III)

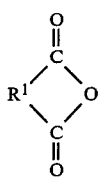

wherein
R¹ represents an optionally substituted aliphatic $C_2$–$C_{20}$-radical, a cycloaliphatic $C_5$–$C_{10}$-radical, an aliphatic-aromatic radical having from 1 to 10 carbon atoms in the aliphatic part and from 6 to 10 carbon atoms in the aromatic part or an aromatic radical having from 6 to 10 carbon atoms, which in addition to the cyclic anhydride group has at least one further cyclic anhdyride group or a carboxyl group.

The following are given as examples: butane tetracarboxylic acid dianhydride, cyclopentane tetracarboxylic acid dianhydride, pyromellitic acid dianhydride, benzophenone tetracarboxylic acid dianhydride, and particularly preferably trimellitic acid anhydride.

In place of the carboxylic acid anhydrides, derivatives can also be used such as the alkyl esters or phenyl esters or the polycarboxylic acids themselves, which are converted into acid anhydrides during the course of reaction.

For regulating the molecular weight, monofunctional reacting carboxylic acids are used under the reaction conditions, for example phthalic acid or the anhydride thereof, benzoic acid, palmitic acid, n-phenyl- or n-dodecyltrimellitic imide acid, which can moreover be substituted by alkyl or halogen such as fluorine or chlorine.

The production of the polyamide imides used according to the invention can take place in solvents, as described in DE-AS No. 1 770 202. Phenols are preferably used as solvent, for example phenol and technical mixtures of o-, m- and p-cresols, moreover lactams such as caprolactam or N-methyl caprolactam, butyrolactam and tetramethylene sulphone.

For the production of the polyamide imides used accordingly to the invention, the reaction components are left with or without solvent for from a few minutes to several hours at a temperature of from 0° to 400° C. The course of reaction can be followed via the evolution of gas, the increase in viscosity and the IR spectra.

Polyamide imides according to the invention, with a relative viscosity, measured on a 1% solution in cresol at 25° C., of from 1.5 to 3.0, preferably from 1.7 to 2.6 mPas, have proven particularly suitable.

It is occasionally advantageous to carry out the production reaction in several stages or to add the individual components in a different order or at different temperatures. Thus, the polymer can be produced in a phenolic solvent, then can be precipitated from the solution with a non-solvent, such as methanol, and possibly subsequently condensed on an extruder.

A preferred embodiment consists in producing the polymer in a solvent, optionally already concentrating in the reaction vessel to a flowable solution or a molten resin or working under pressure, heating for from 1 to 10 h to a temperature of from 200° to 250° C., preferably from 210° to 230° C., and carrying out the remainder of the concentration process, optionally with subsequent condensation, in an evaporation extruder, optionally under a vacuum, at a temperature of from 240° to 400° C., preferably from 280° to 350° C.

Generally, one gram equivalent of carboxylic acid or cyclic carboxylic acid anhydride including from 0.1 to 0.9 gram equivalent, preferably from 0.1 to 0.6 gram equivalent, of trimellitic imidocaproic acid is reacted per gram equivalent of isocyanate and from 0.1 to 2 gram equivalents of lactam, preferably 0.2 to 0.6 gram equivalent of lactam, are reacted per gram equivalent of carboxylic acid anhydride. Substantial deviations from these quantity ratios are also possible.

A further possible embodiment consists in reacting excess isocyanate with di- or tricarboxylic acids, for example adipic acid, sebacic acid, terephthalic acid, isophthalic acid or trimesic acid, and reacting excess carboxylic acid with polyfunctional alcohols, for example ethylene glycol, neopentyl glycol, hexane diol, trimethylol propane, trishydroxyethyl isocyanurate, trishydroxyethyl urazole and polyesters with terminal hydroxy groups.

The production of the polymers according to the invention can be influenced by catalysts, for example by amines such as triethyl amine, 1,4-diazabicyclo-(2,2,2)octane, N-ethyl-morpholine, N-methyl imidazole and 2-methyl imidazole, by inorganic and organic metal compounds, particularly compounds of iron, lead, zinc, tin, copper, cobalt and titanium such as iron (III)-chloride, cobalt acetate, lead oxide, lead acetate, tin octoate, dibutyl tin-dilaurate, copper acetyl acetonate, titanium tetrabutylate, alkali metal phenolates and sodium cyanide and by phosphorus compounds such as trialkyl phosphine and methyl phospholine oxide.

The polymers according to the invention are characterised by particular tensile strength, moduli of elasticity and dimensional stability under heat. Their properties can be varied for the different areas of application, for example as thermoplasts, by modifying the stoichiometric ratios, the degree of condensation, and by mixing low and high molecular weight components such as fillers, pigments, age resistors, lubricants, plasticisers, for example of phenols such as dodecyl phenol and lactams such as dodecane lactam, and further polymers.

EXAMPLES

Example 1

473 g of dodecane lactam are dissolved in a mixture of 2880 g of equal parts of phenol and a technical cresol mixture, and 1800 g of 4,4'-diisocyanatodiphenylmethane, 139.2 g of a mixture of 80% of 2,4- and 20% of 2,6-toluylene diisocyanate, 732 g of trimellitic imidocaproic acid and 1075 g of trimellitic acid anhydride are then introduced at from 120° to 130° C. Stirring is then carried out for 2 h at 170° C., for 2 h at 190° C. and for 4 h at from 200° to 205° C. the condensation takes place with release of carbon dioxide. 1700 g of the solvent are then distilled off and the residue is stirred for a further 2 h at 215° C. On cooling, the polyamide imide is obtained as a brittle resin with a solids content of about 75% by weight. The viscosity of a 15% solution in cresol is $\eta 25 = 1770$ mPas. The resin is crushed by a cutting mill and then concentrated with an evaporation extruder of the type ZSK 32. The maximum casing temperature is 320° C. and the pressure in the evaporation zone is 50 mbar. A light yellow brown transparent elastic resin with a relative viscosity of 2.10, measured at 25° C. on a 1% solution in cresol, is obtained.

Example 2

2.38 g of phenyl isocyanate, 17.4 g of a mixture of 80% of 2,4- and 20% of 2,6-toluylene diisocyanate, 222.5 g of 4,4'-diisocyanato-diphenylmethane, 91.5 g of trimellitic imidocaproic acid and 134.4 g of trimellitic acid anhydride are added to 350 g of phenol/cresol (1:1) and 45.2 g of caprolactam at from 120° to 130° C. The condensation to polyamide imide is carried out with stirring for 2 h at 170° C., for 2 h at 190° C. and for 4 h at 205° C. 210 g of the solvent mixture are then distilled off and stirred for a further 4 h at 215° C. The polyamide imide is obtained as a yellow-brown resin with a solids content of about 75% by weight. The viscosity of a 15% solution in cresol is $\eta^{25}=980$ mPas.

50 g of the resin produced in this manner are melted, treated with 2.1 g of dodecane lactam and evaporated in a flow of nitrogen firstly at 250° C. and then at 300° C. A meltable, elastic resin with a relative viscosity of $\eta=1.98$, measured at 25° C. on a 1% solution in cresol, is obtained.

Example 3

62.5 g of 4,4'-diisocyanato-diphenylmethane, 65.5 g of 4,4'-diisocyanatodicyclohexylmethane, 45.8 g of trimellitic imidocaproic acid and 67.2 g of trimellitic acid anhydride are added to 180 g of phenol/cresol (1:1) and 19.7 g of dodecane lactam at from 120° to 130° C. Stirring is then carried out for 2 h at 170° C., for 2 h at 190° C. and for 4 h at 205° C. 180 g of the solvent mixture are then distilled off and stirred for a further 2 h at 215° C. On cooling, the polyamide imide is obtained as a light brittle resin with a solids content of about 75% by weight. The viscosity of a 15% solution of the polyamide imide in cresol is $\eta^{25}=890$ mPas.

A sample of the resin is evaporated in a flow of nitrogen, firstly at 250° C. and then at 300° C. A light elastic resin with a relative viscosity of $\eta^{25}=1.92$ is obtained.

Example 4

22.6 g of caprolactam, 112.5 g of 4,4'-diisocyanato-diphenylmethane, 8.7 g of 2,4-toluylene diisocyanate, 91.5 g of trimellitic imidocaproic acid and 38.4 g of trimellitic acid anhydride are reacted in 170 g of phenol/cresol (1:1) for 3 h at 190° C. and for 6 h at 205° C. Dilution to a solids content of about 15% by weight is then carried out with 1130 g of cresol.

The viscosity of this solution is $\eta^{25}=920$ mPas.

The polyamide imide is precipitated with excess methanol as a yellow powder from a sample of the solution produced in this manner, which powder is fused together at 300° C. under nitrogen to produce a clear elastic resin.

Example 5

200 g of 4,4'-diisocyanato-diphenylmethane, 42 g of a technical mixture of 2,2,4- and 2,4,4-trimethylhexamethylene-(1,6)-diisocyanate, 61.0 g of trimellitic imidocaproic acid and 153.6 g of trimellitic acid anhydride are added to 370 g of phenol/cresol (1:1) and 78.8 g of dodecane lactam at from 120° to 130° C. The condensation is carried out with stirring for 2 h at 170° C., for 2 h at 190° C. and for 4 h at 205° C. 260 g of the solvent mixture are then distilled off under vacuum and the residue is stirred for a further 4 h at 215° C. On cooling, the polyamide imide is obtained as a light yellow brown resin. The solids content is about 80% by weight, the viscosity of a 15% solution in cresol is $\eta^{25}=1180$ mPas.

A sample of the resin produced in this manner is stoved to a light elastic polymer in a flow of nitrogen at 250° C. and 300° C. The relative viscosity is $\eta^{25}=2.04$, measured on a 1% solution in cresol.

We claim:

1. A process for the production of polyamide imides which comprises reacting at a temperature of from 0° to 400° C. polyisocyanates, cyclic polycarboxylic acid anhydrides, lactams and trimellitic imidocarboxylic acids of the formula

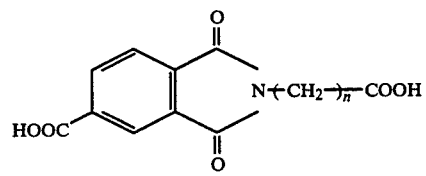

wherein n is an interger from 1 to 20.

2. The process according to claim 1 wherein the lactams have the formula

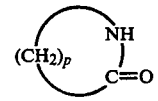

wherein p is six or greater.

3. The process according to claim 1 wherein the trimellitic imidocarboxylic acid has the formula

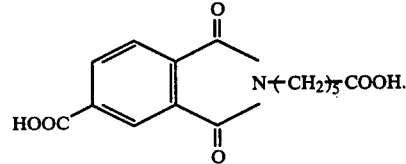

4. The process according to claim 1 wherein the trimellitic imidocarboxylic acid is trimellitic imidocaproic acid and the lactam is undecane lactam or dodecane lactam.

5. The process according to claim 1 wherein the cyclic polycarboxylic acid anhydride is trimellitic acid anhydride.

6. Polyamide imides prepared by the process according to claim 1.

7. A thermoplastic molding composition which comprises a polyamide imide according to claim 1.

* * * * *